United States Patent [19]

Kavick

[11] 4,319,774
[45] Mar. 16, 1982

[54] HOSE AND COUPLING ASSEMBLY

[75] Inventor: Edward M. Kavick, Chardon, Ohio

[73] Assignee: Eaton Corporation, Cleveland, Ohio

[21] Appl. No.: 31,682

[22] Filed: Apr. 19, 1979

[51] Int. Cl.³ .............................................. F16L 33/22
[52] U.S. Cl. ..................................... 285/256; 285/259
[58] Field of Search ............... 285/256, 259, 248, 249, 285/257, 320, 322, 323, 328

[56] References Cited

U.S. PATENT DOCUMENTS

| | | | |
|---|---|---|---|
| 382,468 | 5/1888 | Haley | 285/259 X |
| 589,216 | 8/1897 | McKee | 285/259 |
| 1,113,770 | 10/1914 | Gabrohn | 285/254 X |
| 2,121,624 | 6/1938 | Cowles | 285/256 |
| 2,273,398 | 2/1942 | Couty et al. | 285/259 X |
| 2,449,916 | 9/1948 | Tandet | 285/259 |
| 2,560,565 | 7/1951 | Freeman | 285/256 |
| 4,099,748 | 7/1978 | Kavick | 285/256 |
| 4,150,848 | 4/1979 | Dyrup | 285/328 |

FOREIGN PATENT DOCUMENTS

| | | | |
|---|---|---|---|
| 1225189 | 2/1960 | France | 285/256 |
| 1495499 | 8/1967 | France | 285/256 |

Primary Examiner—Dave W. Arola
Attorney, Agent, or Firm—C. H. Grace; A. E. Chrow; J. Yakimow

[57] ABSTRACT

A substantially tubular shaped insert (1) adapted to fit coaxially about the end of a hose and to be contracted against the hose by the shell of a coupling to provide an improved hose and coupling assembly for the conveyance of fluids under pressure. The insert has a separation space (2) in its wall that extends longitudinally along the entire length thereof and one or more longitudinally extending primary elongate openings (4) through its wall that are disposed in a substantial uniform array about its circumference. The longitudinal axis of space (2) and openings (4) are skewed from 0° to about 45° from the inserts central axis and the areas provided by space (2) and openings (4) are such that, upon contraction of the insert against the hose, portions of the wall of the hose are caused to extend into space (2) and openings (4) to provide an improved circumferentially uniform longitudinally extending engagement between the coupling and the hose.

13 Claims, 11 Drawing Figures

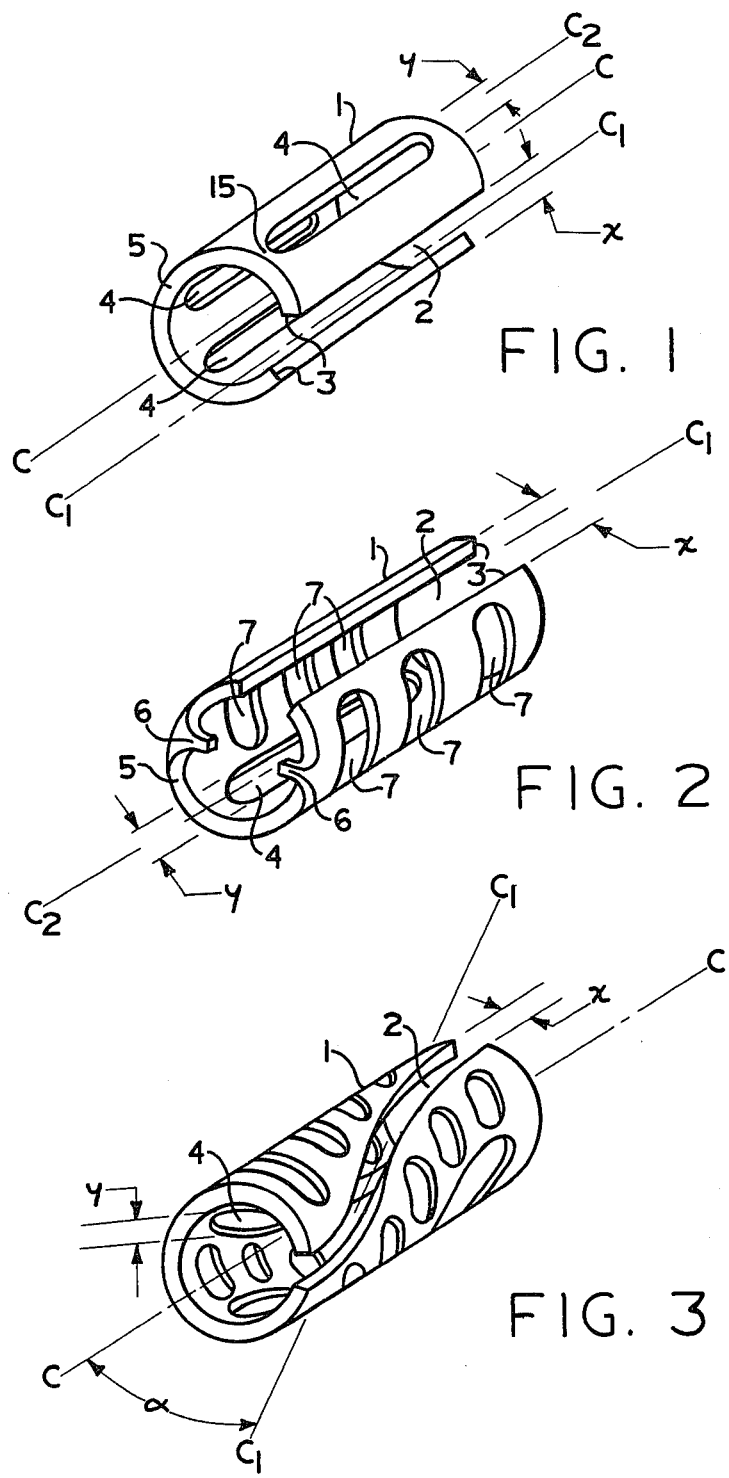

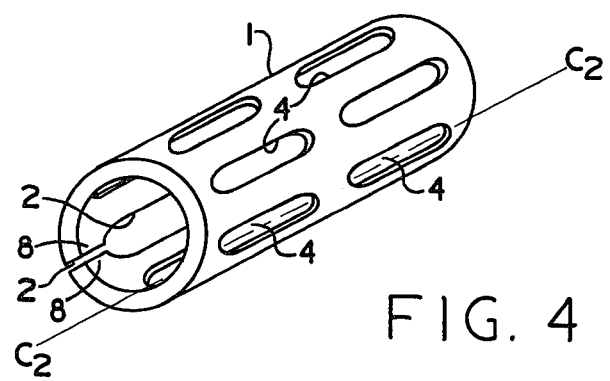
FIG. 4
FIG. 5
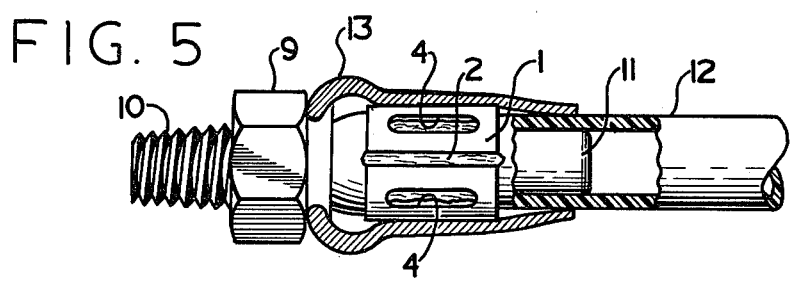
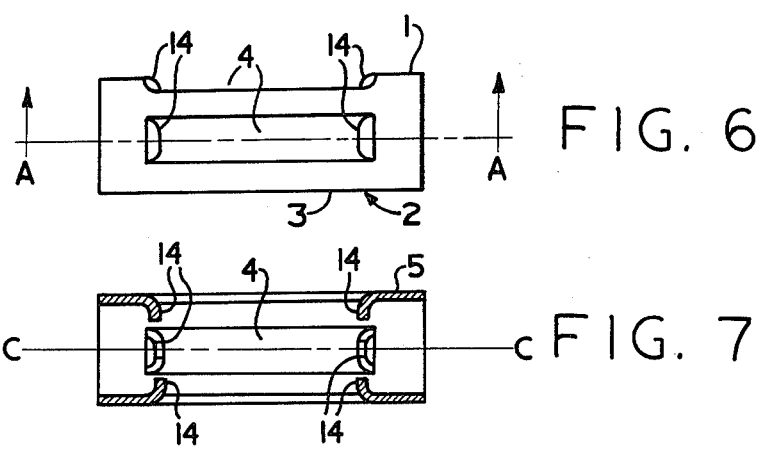
FIG. 6
FIG. 7

HOSE AND COUPLING ASSEMBLY

INTRODUCTION

This invention relates generally to a permanently attached or reusable coupling secured to the end of a hose for use in the conveyance of fluids under pressure and more particularly to a permanently attachable or reusable coupling utilizing an insert as a means of improving the securement of the coupling to the hose under varying temperature and pressure conditions.

BACKGROUND OF THE INVENTION

It has been proposed before to utilize various devices to improve the securement of a coupling to a hose. An example of one such device is disclosed in U.S. Pat. No. 589,216 in which a sheet metal band having diagonal edges and prongs is disposed between a coupling and the inner wall of the bore of a bore. The band is designed in such a manner that the diagonal edges substantially close when the band is secured to the outer surface of the coupling and the prongs are adapted to engage the inner wall of the hose bore when the coupling is inserted into the bore of the hose. The band, however, relies solely on the barbs as a means of securing the hose to the coupling and does not provide for a portion of the wall of the hose to flow between its diagonal edges nor does it have one or more longitudinally extending primary elongate openings in its wall disposed in a uniform array about its circumference into which the wall of the hose will extend to provide a circumferentially uniform longitudinally gripping engagement with the wall of the hose. Another example of a device used to improve the securement of a coupling to a hose is disclosed in U.S. Pat. No. 2,121,624 in which a wire helix is disposed between the shell of a coupling and the outer surface of a hose to provide a flexible conduit connection. The use of the helically coiled wire disclosed in U.S. Pat. No. 2,121,624 has the disadvantage that the inner surface of the shell is required to be threaded in order to receive and position the helical coils of the wire in a uniform manner in order to prevent the coil from warping when compressed between the hose and the shell of the coupling. It is an advantage of the insert of the present invention that it can be used without subjecting the inner surface of the shell of the coupling with which it is used to a costly machining operation such as threading. A solution to the problem of warp associated with helically coiled wire used in conjunction with hose couplings is disclosed by the inventor of the present invention in U.S. Pat. No. 4,099,748 in which circumferentially spaced longitudinal members are used to secure an axial spaced relationship between at least a portion of the coils. Although the helically coiled wires disclosed in U.S. Pat. Nos. 2,121,624 and 4,099,748 may be used to their respective advantage, their use generally requires, as described above, either subjecting the inner surface of the coupling shell to a costly threading operation or in having to provide means of securing a spaced re-relationship between the coils. A further disadvantage associated with using helically coiled wire to improve the securement between a coupling and a hose is that coils required to fit within the annular space available between the inner surface of the shell and the outer surface of the hose may not be commercially available and, as a result thereof, the user may incur additional costs in order to have it specially made to meet the requirements of a particular application. In contrast, the insert of the present invention can be made in a relatively simple forming operation as hereinafter described. A further example of a device used to improve the securement of a coupling to a hose can be found in U.S. Pat. No. 2,449,916 in which a tapered, split, internal compression ring having one or more circumferentially extending elongated openings is disclosed. The circumferential extending axis of the ring openings are normal to the longitudinal central axis of the ring and substantially normal to the longitudinally extending axis of the split in the wall of the ring. Although the tapered split ring disclosed in U.S. Pat. No. 2,449,916 may be used to impart a circumferential gripping engagement with the wall of the hose with which it is used, it does not engage the wall of the hose in the improved manner of the insert of the present invention whereby the wall of the hose is gripped in a longitudinally extending substantially uniform manner about the circumference of the hose.

The ability to maintain a reliable attachment between a coupling and the end of a hose operating under varying temperature and pressure conditions has been a problem in the past. The above described devices illustrate examples of the variety of means that have been utilized in attempts to improve the manner in which a coupling is secured to the end of a hose. The insert of the present invention has been found to provide a means of improving the securement of a coupling to the end of a hose operating under varying temperature and pressure conditions without having to subject the shell of a coupling to a costly threading operation and without having to rely solely upon prongs and the like to penetrate into the wall of the hose in order to insure the secured relationship between the end of the hose and the coupling. It has further been found that the insert of the present invention can be made in a low cost forming operation and is therefore not subject to the commercial nonavailability of specifically dimensioned coiled springs hereinbefore described. By providing a circumferentially uniform longitudinally extending gripping engagement with portions of the wall of the hose, the insert of the present invention has been found to provide an improved means of maintaining the securement of a coupling to the end of a hose operating under varying temperature and pressure conditions heretofore unknown in the prior art.

SUMMARY OF THE INVENTION

It is therefore an object of this invention to provide an improved permanently attachable or reusable coupling and hose assembly for use in the conveyance of fluids under varying temperature and pressure conditions.

It is another object of this invention to provide a low cost insert adapted to be compressed between the outer surface of the end of a hose and a coupling to improve the securement therebetween under varying pressure and temperature conditions.

It is a further object of this invention to provide a low cost insert adapted to be compressed between the shell of a coupling and the outer surface of the end of a hose that does not require a costly threading operation to the inner surface of the wall of the coupling shell nor does it rely solely upon penetration of barbs or prongs and the like into the wall of the hose to insure the securement between the coupling and the hose.

It is yet another object of this invention to provide a contractible insert adapted to be compressed between the shell or nut of a coupling and the outer surface of the end of a hose and improve the secured relationship between the coupling and the end of the hose by providing a substantially circumferentially uniform longitudinally extending gripping engagement between the insert and the hose.

It is a feature of this invention to provide a substantially tubular shaped contractible insert that is adapted to fit coaxially between the outer surface of an end of a hose and the shell or nut of a coupling and that is designed such that, when the insert is contracted against the outer surface of the hose, portions of the wall of the hose are caused to extend into a separation space in the wall of the insert that extends longitudinally along the length thereof and into one or more longitudinally extending primary openings through the wall of the insert that are disposed in a substantially uniform array with the separation space about the inserts circumference to provide a circumferentially uniform longitudinally extending gripping engagement between the insert and the hose and thereby provide an improved means of securing the coupling to the end of the hose.

BRIEF DESCRIPTION OF THE DRAWINGS

FIG. 1 is a perspective view of an embodiment of a contractible insert made in accordance with the invention;

FIGS. 2 through 4 are perspective views of other embodiments of a contractible insert made in accordance with the invention;

FIG. 5 is a partially cut-away side elevation of a hose and coupling assembly using a permanently attached coupling in accordance with the invention;

FIG. 6 is a side elevation of an embodiment of the invention;

FIG. 7 is a Section a—a taken longitudinally through the embodiment of the insert shown in FIG. 6;

DETAILED DESCRIPTION OF PREFERRED EMBODIMENTS

Figure 8:
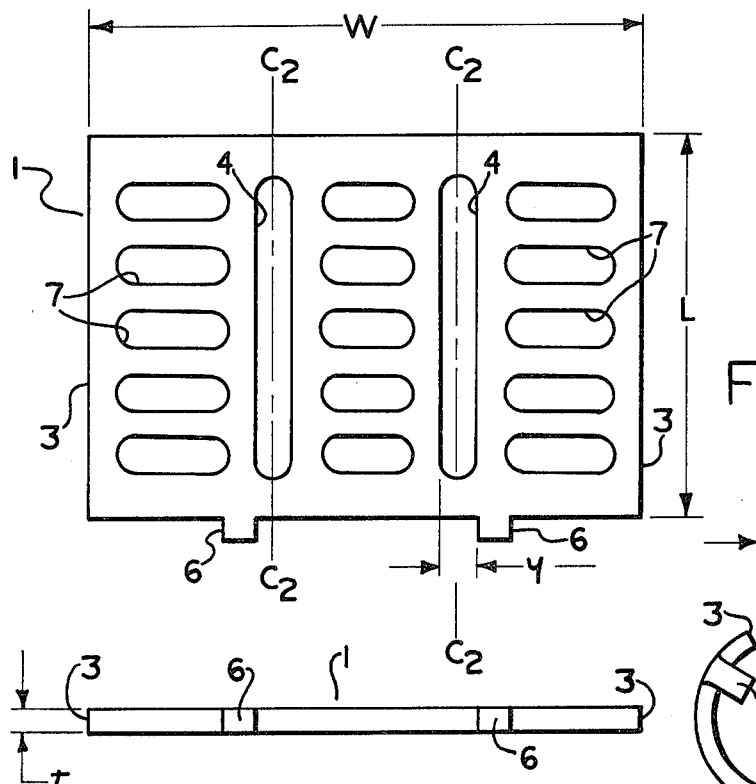
FIGS. 8 through 10 illustrate a preferred method of making the contractible insert of the invention.

FIG. 1 shows an embodiment of a substantially tubular shaped contractible insert 1 made in accordance with the invention prior to its contraction radially inwardly during the process of securing a permanently attachable or reusble coupling to the end of a hose. Insert 1 has a separation space 2 disposed along the entire length thereof. Space 2 has a central longitudinally extending axis $C_1$ that is aligned substantially parallel with central longitudinally extending axis C of insert 1. Three primary elongated openings 4 are defined by bridging members 15 in wall 5 of insert 1 and have a circumferential width "y". Members 15 are dimensioned to provide integrity to the insert wall in the region of the primary openings such that they suitably withstand the forces of compression arising during compression of the insert. The central longitudinally extending axis $C_2$ of openings 4 are aligned substantially parallel with axis $C_1$ of space 2 and are disposed in uniform array around the circumference of insert 1 such that the circumferential distance between the axis $C_2$ of any adjacent openings 4 and between the axis $C_1$ of space 2 and any adjacent openings 4 is approximately equivalent. Two apposed facing edges 3 in the wall of insert 1 extend along its entire length and are spaced apart to form separation space 2. As in all embodiments of the invention, circumferential width "x" of separation between edges 3 prior to contraction of insert is related to the amount of contraction to which insert 1 will be subjected to in its use in the securement of a permanently attachable or reusable coupling to a particular hose. It has been found: (1) that when edges 3 are spaced apart prior to contraction of insert 1 to provide a circumferential width "x" of separation therebetween that is approximately equivalent to the circumferential width "y" of the space provided by an opening 4 laying along axis $C_2$ and; (2) when the total area provided by openings 4 aligned along each axis $C_2$ is substantially the same as the area provided by space 2 and; (3) when insert 1 will not be compressed radially inwardly to the extent that edges 3 will touch each other for a major portion along the length thereof when insert 1 is contracted during the process of securing a coupling to a particular hose, that portions of the wall of the hose or tube that are not being compressed by the wall of insert 1 during the securement of the coupling will extend into space 2 and the openings 4 to provide a more uniform circumferentially distributed longitudinally extending gripping engagement with the wall of the hose. The term "substantially the same" as used in regard to the total area of the openings 4 herein means the total area of the openings 4 laying along a particular axis $C_2$ is the same as the area of the separation space less the area occupied by bridging members 15. The thickness of wall 5 of insert 1 is dependent upon the material selected to provide the formability (contractibility) and strength required as well as to provide resistance from corrosive elements and fit within the dimensional clearance available between the inside diameter of the coupling shell to be compressed and the outer diameter of the hose to which the coupling is to be secured. The inside diameter of insert 1 is sized such that it can be easily slipped over the end of the hose or tube during the coupling securing process. Insert 1 typically has an inside diameter prior to contraction that is about 0.010 inches larger than the maximum diameter of the hose to which it is to be secured.

In FIG. 2, insert 1 has only one primary opening 4. As in all embodiments of the invention, the insert has a portion of its wall separated along its entire length to provide apposed facing edges 3 that are spaced apart a circumferential width "x" to provide longitudinally extending separation space 2. Opening 4 is disposed in wall 5 diametrically opposite to space 2. Axis $C_2$ of opening 4 is in substantial parallel alignment with axis $C_1$ of space 2. Apposed facing edges 3 are spaced apart such that, prior to contraction of insert 1, the circumferential width "x" provided therebetween is approximately equivalent to the circumferential width "y" and the area of opening 4 is substantially the same as the area provided by space 2. Tabs 6 extend radially inwardly from end of wall 5 to provide a stop against which the end of the hose comes against when it is inserted through the opposite end of insert 1. Other suitable means of positioning insert 1 on the end of the hose are considered to be within the scope of this invention. A plurality of secondary openings 7 through wall 5 of insert 1 are shown in FIG. 2 disposed between opening 4 and space 2. Although it is preferred, it is not absolutely required to have openings 7 disposed through the wall of the insert of the invention between adjacent primary openings 4 and between an opening 4 adjacent to space 2 such as shown in FIGS. 2, 3 and 8. Although openings 7 shown in FIGS. 2, 3 and 8 have an elliptical shape, they may have any shape such as, for example, circular, triangular, or irregular. Openings 7 differ from primary openings 4 in that they are not required to be elongate openings having longitudinal extending axis that are skewed not more than 45 degrees from the central longitudinal axis of the insert of the invention nor is the sum of the area of a plurality of openings 7 laying along a particular longitudinal extending axis required to be substantially the same as the area of space 2 prior to the contraction of the insert.

FIG. 3 shows an embodiment of the insert where the axis $C_1$ of space 2 is skewed from the insert central axis C by an angle $\alpha$ when viewed radially inward from $C_1$ to C. It has been found that angle $\alpha$ may range from 0° (parallel to C) to about 45° and preferably from 0° to about 20°. Also shown in FIG. 3, are two primary openings 4 in the wall of insert 1 having circumferential width "y" and having their central longitudinally extending axis (not shown) substantially parallel to axis $C_1$ and disposed in a substantially uniform array around the circumference of insert 1 as hereinbefore described. The circumferential width "x" separating edges 3, prior to contraction of insert 1, is approximately equal to the circumferential width "y" of openings 4 and the area of the space provided by each opening 4 is substantially the same as the area provided by the space 2.

Although FIG. 3 shows a preferred embodiment of the insert having the skewed axis of openings 4 substantially parallel with the skewed axis of space 2 and FIGS. 1, 2 and 4 through 8 show preferred embodiments of the insert having the axis of openings 4 and space 2 substantially parallel with each other and with the central axis of the insert, it is to be understood that the axis of openings 4 and space 2 do not have to be parallel with each other provided they are not skewed more than 45° from the central axis of the insert and provided that an opening 4 laying along a particular skewed axis does not interfere with an opening 4 laying along a skewed axis adjacent thereto.

FIG. 4 illustrates an embodiment of the insert having more than one primary elongated opening 4 disposed in the wall of the insert along a particular axis $C_2$. In FIG. 4 five longitudinally extending axis $C_2$ (only one axis marked) are disposed in uniform array around the circumference of insert 1. The sum of the areas of the openings 4 laying along each axis $C_2$ is substantially the same as the area provided by space 2. The embodiment also illustrates that separation space 2, if preferred, is not required to be formed solely by apposed edges of the wall of insert 1 that are spaced apart an equal distance along the entire length thereof. One or more apposed extensions such as, for example, extensions 8 of the wall of insert 1 may extend towards each other to provide a space 2 therebetween that is less than at other points along the length thereof. It is preferred however that these extensions do not touch each other and that the edges remain spaced apart for a substantial distance along their length after contraction of insert 1 against the outer surface of the hose.

FIG. 5 illustrates a typical coupling permanently attached to the end of a hose and the incorporation therein of the insert of the invention. Coupling body member 9 has means of attachment to a source of fluid in the form of externally threaded end 10 disposed at a first end thereof and substantially tubular shaped nipple 11 extending from a second end from the body member away from attachment means 10 and into the bore of hose 12. Shell 13 extends away from the body member coaxially about nipple 11. Insert 1 is coaxially disposed intermediate shell 13 and the outer surface of hose 12. Shell 13 has been compressed radially inwardly by means commonly used in the industry such as, for example, forcing shell 13 axially through a split tapered die in a swaging operation or by forcing circumferentially spaced metal members (fingers) radially inwards against shell 13 in a crimping operation. The inner surface of the wall of insert 1 is compressed radially inwardly against the outer surface of hose 12 by shell 13. The wall of hose 12 is compressed between nipple 11 and the inner surface of the wall of insert 1 and portions of the wall of hose 12 are caused to flow (extend) into separation space 2 and primary elongated openings 4 and (any other secondary openings provided in the wall of insert 1 as hereinbefore described) to provide a substantially circumferentially uniform array of longitudinally extending gripping engagements with the wall of hose 12 as hereinbefore described and as shown typically as the darkened areas in separation space 2 and primary openings 4 in FIG. 5. Although nipple 11 is shown having a relatively smooth outer surface, it is to be understood that nipple 11 may have a barbed, grooved or roughened surface for further improvement of the grip of the outer surface of nipple 11 to the inner surface of the hose bore. Although the inner surface of shell 13 is depicted as smooth in FIG. 5, it is also to be understood that the inner surface of shell 13 may contain irregularities in the inner surface thereof such as, for example, grooves for further improvement of the gripping ability of the inner surface of shell 13 and the outer surface of hose 12 and/or the outer surface of the wall of insert 1. Although attachment means end 10 is shown in FIG. 5 as an externally threaded male pipe member, it may comprise any suitable means for attaching the coupling to a source of fluid.

The use of insert 1 with either permanently attachable or reusable couplings is considered within the scope of the invention. In the case of reusable type couplings, body 9 of the coupling is generally provided with threads for engagement with a threaded nut used in place of shell 13 such that as the nut is turned, it engages with and is drawn towards the reusable coupling body member and either or both a tapered surface on its inner wall or a tapered surface on an intermediate sleeve disposed between the nut and insert 1 is caused to press radially inwardly against the outer surface of insert 1 and contract it radially inwardly against the outer surface of the hose to secure the reusable coupling thereto.

Although a coupling used in conjunction with the insert of the invention is typically made from a metallic material such as aluminum, steel or brass, it may also be made from suitable polymeric materials capable of providing the performance characteristics desired. Machinability, formability, strength, and resistance to corrosion are some of the more important factors in selecting the materials required for a particular application. Similarly, insert 1 may be made from a metallic material such as aluminum, steel or brass, or from a polymeric material depending upon the formaility, machinability, strength and resistance to corrosion desired. It is required however that the insert be made from a material that is capable of being contracted and firmly held in place by the shell being utilized and that the insert be capable of compressing the wall of the hose (or tube) to cause portions thereof to flow (extend) into the separation space and primary and secondary (if any) openings provided therein to provide the uniform longitudinal gripping engagement herein described. In this respect, alloys of aluminum and brass have been found to be of advantage in making inserts in accordance with the invention.

Although the invention has been described with reference to a hose, either a reinforced hose or a tube may be used. The term reinforce hose generally refers to a tubular elongate product for use in the conveyance of fluids comprising an inner core tube, one or more layers of fibrous and/or metallic reinforcement disposed in tensioned engagement about the core tube and a protective outer jacket disposed in encompassing relationship about the reinforcement layer or layers. The term tube generally refers to an elongate tubular product having a singular or composite wall made from one or more materials and devoid of any layers of tensioned fibrous and/or metallic reinforcement about its outer surface. Rubber, polyurethane, thermoplastic rubber and polyester are typical examples of materials commonly used to make hoses and tubes suitable for use with the coupling and insert of the invention. Importantly, it is required that the polymeric material of the hose or tube adjacent the inner surface of the wall of the insert of the invention possess the ability to flow (extend) into the separation space and primary elongated openings and secondary openings (if any) as hereinbefore described.

FIGS. 6 and 7 show an embodiment of the insert wherein during the process of making primary openings 4 through wall 5, portions of wall 5 have been formed to provide protrudences 14 which extend radially inwardly towards the insert longitudinal central axis C. Although only the end portions of openings 4 are shown in FIGS. 6 and 7 as providing protrudences 14, it is to be understood that any portion of the edges of wall 5 of insert 1 defining primary openings 4 or edges 3 of space 2, may be formed such that they provide protrudences 14 which extend radially inward towards axis C. The distance by which protrudences 14 extend radially inwardly from the inner surface wall 5 of insert 1 is necessarily controlled such that they do not penetrate completely through the wall of the hose to which insert 1 is contractively attached.

Figure 9:
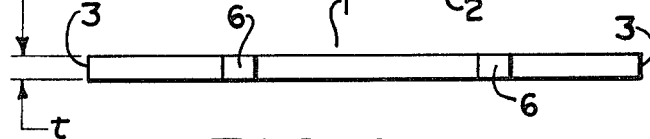
Figure 10:
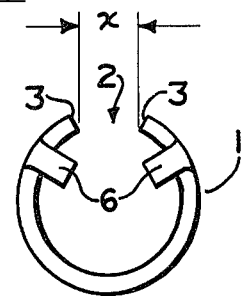

FIGS. 8 through 10 show an embodiment of a preferred method of making the contractible insert. Shown in the plan view of FIG. 8 is insert 1 in the form of a flat sheet having two primary elongated openings 4 having their longitudinally extending central axis $C_2$ substantially parallel aligned with each other and with outer longitudinally extending edges 3 along the length L of insert 1. Axis $C_2$ are spaced apart in a uniform array from edges 3 across the width W of insert 1. When formed into the substantially tubular shape shown in FIG. 10, the area of each opening 4 is substantially the same as the area defined between apposed edges 3. The width W of insert 1 is determined by calculating the inner diameter of the insert required to permit the end of the hose to which it is to be secured to be inserted therethrough when insert 1 is formed into a tubular shape. One convenient method of determining the total circumferential widths "y" of openings 4 and width "x" separating edges 3 of space 2 is by calculating the circumferential width of the insert theoretically contracted onto and enclosing the entire outer surface of the hose at a convenient location on its wall, such as its outer surface, and subtracting the circumferential width so obtained from the circumferential width of the insert at the same location on its wall prior to contraction of the insert. The difference in circumferential width so obtained represents the total circumferential distance available to provide the separation width "x" between edges 3 and the number of circumferential widths "y" of openings 4 determined suitable. For example, if the difference between the outer circumference of insert 1 before and after contraction is 0.800 inch and it was determined that three (3) openings 4 were desirable, then since width "x" of space 2 is approximately the same as width "y" of opening 4, 0.800 is divided by 4 (3+1) to provide 0.200 inch as the circumferential width "y" of each of the three (3) openings 4 and the circumferential width "x" separating edges 3 to provide space 2. Once determined, the area provided by space 2 can be calculated and the area provided by each opening 4 in FIG. 8 is to be substantially the same as the area of space 2. The thickness t shown in FIG. 9 and length L shown in FIG. 10 are determined in the manner previously described herein. Also shown in the plan view of FIG. 8 are secondary openings 7 disposed in the wall of the sheet form of insert 1 between openings 4 and between openings 4 and edges 3. The sheet form of insert 1 in FIG. 8 is further provided with tabs 6 extending from the end of insert 1 to provide a stopping means for positioning the end of the hose or tube as hereinbefore described. The distance by which the ends of tabs 6 extend away from the end of insert 1 should be such that when the tabs are turned radially inward after forming the sheet form of insert 1 into the tubular shape shown in FIG. 10, and the insert is contracted in accordance with the invention, the ends of the tabs do not extend into the bore of the hose or tube and interfere with the flow of fluid therethrough.

Following Table I illustrates typical dimensioning of an insert that is suitable for use with a ¼" I.D. hose.

TABLE I

| | |
|---|---|
| Hose Maximum O.D. = | .513 inch |
| Hose Minimum O.D. = | .470 inch |
| Insert width W prior to forming into tubular shape = | +.000 inch 1.613 −.015 inch |
| Insert Length L = | .625 ±.015 inch |
| Insert Material = | Aluminum Alloy |
| Insert Thickness T = | .030 inch |
| Number of primary openings 4 (one opening along each axis parallel to axis C of separation space 2) = | 3 |
| Circumferential width "y" of primary opening 4 = | .202 inch |
| Length of each primary opening 4 = | .500 inch |
| Insert I.D. after forming into tubular shape = | .513–.523 inch |
| Circumferential width "x" of separation space when formed into tubular shape having I.D. of .513–.523 inch = | .203 inch |
| Area provided by separation space = | .127 inch$^2$ |
| Area provided by each primary opening = | .102 inch$^2$ |
| I.D. of insert after contracting on hose = | .320 inch |

Although the insert of the invention may be formed by molding or machining, it is preferred that the insert be formed by stamping a sheet made, for example, from an alloy of aluminum or brass. As illustrated in FIGS. 8 through 10, the sheet form is subsequently formed into a substantially tubular shape such as, for example, by forming about a mandrel having a diameter thereof determined by the process described above and folding tabs 6, if any, radially inwardly.

Figure 11:
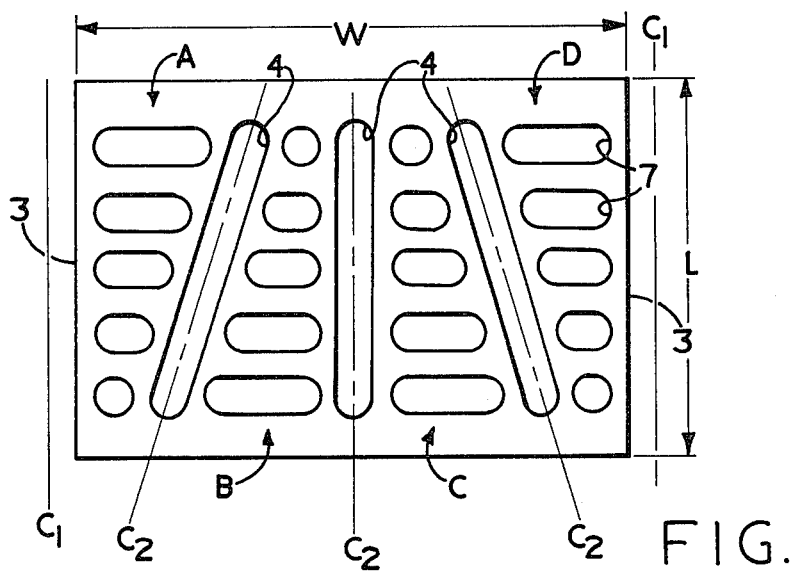
FIG. 11 is a view similar to FIG. 8 of another embodiment of the invention.

FIG. 11 shows an embodiment of the insert of the invention in the form of a flat sheet prior to the formation thereof into a substantially tubular shape such as, for example, described herein in reference to FIGS. 8 through 10. Shown in FIG. 11 are three primary elongate openings 4 through the wall of the insert having their respective axis $C_2$ extending longitudinally along length L of the insert and space in a uniform array across width W of the insert defined a pair of spaced-apart edges 3. The embodiment of FIG. 11 illustrates that the longitudinal axis $C_2$ of openings 4 of inserts of the invention, as hereinbefore described in reference to FIG. 3, are not required to be in parallel alignment with each other or with axis $C_1$ which is shown adjacent to edges 3 in FIG. 11 as the axis of the separation space that would result when the sheet is formed into a tubular shape. Openings 4 are arranged to provide substantially equal wall areas A, B, C and D having a plurality of secondary openings therethrough. The areas provided in A, B, C and D will press against the hose with which the insert is used and force the hose into the primary openings, secondary openings and the separation space to provide the longitudinally extending uniformly circumferentially distributed gripping engagement between the insert and the hose.

What is claimed is:

1. A substantially tubular shaped contractible insert for use in conjunction with a permanently attachable or reusable coupling to improve the securement of the coupling to the end of a hose used in the conveyance of fluids under pressure, said coupling having a body member having means for attaching the coupling to a source of fluid disposed at a first end thereof, a substantially tubular shaped nipple extending from a second end of the body member disposed away from the attachment means end and adapted to extend into the bore of a hose, and a compressible shell extending from the body member second end coaxially about the nipple and adapted to enclose the outer surface of the hose and compress the insert against the outer surface of the hose, said insert adapted to be disposed coaxially between the shell and the outer surface of the hose and having: a separation space defined by apposed facing edges in the wall of the insert that extend longitudinally along the entire length of the insert and are spaced apart a distance sufficient to insure that the edges do not touch each other for at least a substantial distance along their length upon contraction of the insert during the securement process; one or more longitudinally extending primary elongate openings through the wall of the insert laying along one or more longitudinally extending axis that are distributed, along with the separation space axis, in a substantially uniform array about the circumference of the insert; said separation space axis and each of said primary opening axis skewed from 0° to about 45° from the central longitudinal axis of the insert; and said separation space having an area thereof that, prior to contraction of the insert during the securement process, is substantially the same as the sum of the areas provided by the one or more primary openings laying along each of the one or more longitudinally extending primary opening axis of the array, such that, upon contraction of the insert, portions of the wall of the hose compressed between the wall of the insert and the nipple are caused to extend into the separation space and the primary openings to provide an improved longitudinally extending uniformly circumferentially distributed gripping engagement between the insert and the wall of the hose.

2. The insert of claim 1 having only one primary opening along each of the primary opening axis of the array and the area of each primary opening is substantially the same as the area of the separation space.

3. The insert of claim 1 wherein the longitudinally extending axis of the separation space and each of the longitudinally extending primary opening axis are in substantial parallel alignment with the central longitudinal axis of the insert.

4. The insert of claim 1 wherein one or more secondary openings are disposed through the wall of the insert between any adjacent primary openings and between the separation space and any primary opening adjacent thereto.

5. The insert of claim 1 including means for positioning the insert on the end of the hose.

6. The insert of claim 5 wherein the positioning means comprises one or more tabs extending radially inwardly from the wall of the insert at one end thereof and against which the end of the hose comes against where inserted through the opposite end of the insert.

7. A hose and coupling assembly for use in the conveyance of fluids under pressure comprising: a hose; a coupling secured to the end of the hose having a body member having means for attaching the coupling to a source of fluid disposed at a first end thereof, a substantially tubular shaped nipple extending from a second end of the body member disposed away from the attachment means end and into the bore of the hose, a radially inwardly compressed shell member extending away from the body member second end coaxially about the nipple and enclosing the outer surface of the hose; and a substantially tubular shaped contracted insert disposed coaxially between the shell and the outer surface of the hose and having: a portion of the wall of the hose extending into a separation space defined by apposed facing edges in the wall of the insert that extend longitudinally along the entire length of the insert and do not touch each other for at least a substantial distance along their length; a portion of the wall of the bore extending into one or more longitudinally extending primary elongate openings through the wall of the insert laying along one or more longitudinally extending axis that are distributed, along with the separation space axis, in a substantially uniform array about the circumference of the insert; said separation space axis and each of said primary opening axis skewed from 0° to about 45° from the central longitudinal axis of the insert; and said separation space having an area thereof that, prior to contraction of the insert during the securement process, was substantially the same as the sum of the areas provided by the one or more primary openings laying along each of the one or more longitudinally extending axis of the array so as to provide an improved longitudinally extending uniformly circumferentially distributed gripping engagement between the insert and the wall of the hose.

8. The assembly of claim 7 wherein the insert has only one primary opening along each of the primary opening axis of the array and the area of the separation space, prior to contraction of the insert, was substantially the same as the area of each of the primary openings.

9. The assembly of claim 7 wherein the insert is provided with means for positioning the insert on the end of the hose.

10. The assembly of claim 9 wherein the means for positioning the insert comprises one or more tabs that extend radially inwardly from the end of the wall of the insert and press against the end of the hose adjacent the coupling body member.

11. A substantially tubular shaped contractible insert for use in conjunction with a permanently attachable or reusable coupling to improve the securement of the coupling to the end of a hose used in the conveyance of fluids under pressure, said coupling having a body member having means for attaching the coupling to a source of fluid disposed at a first end thereof, a substantially tubular shaped nipple extending from a second end of the body member disposed away from the attachment means end and adapted to extend into the bore of a hose, and a compressible shell extending from the body member second end coaxially about the nipple and adapted to enclose the outer surface of the hose and compress the insert against the outer surface of the hose, said insert adapted to be disposed coaxially between the shell and the outer surface of the hose and comprising: a wall having a given length; a pair of opposed facing edges along said length defining a sparation space laying along a longitudinally extending axis, said edges prior to contraction of said insert during the securement process being spaced a distance from each other over substantially the entire length of said wall, said distance being sufficient to ensure that said edges do not touch each other over said distance during the securement process; one or more longitudinally extending primary openings through said wall, each opening laying along a longitudinally extending axis, the area of said openings along any axis being substantially equal to the area of said separation space prior to contraction; each of said axis of said separation space and said openings being located at an angle of from 0° to 45° relative the central longitudinal axis of said insert; and further each of said axis of said separation space and said openings being positioned on the circumference of said wall to divide said wall into a plurality of areas between said axis of said separation space and said openings which are substantially equal to one another such that upon contraction of said insert said areas will press against said hose and force said hose into said separation space and said openings to provide longitudinally extending uniformly circumferentially distributed gripping engagement between the insert and said hose.

12. The insert of claim 11 further comprising a plurality of secondary openings disposed through said wall between adjacent axis of said separation space and said openings.

13. The insert of claims 1 or 11 wherein the compressible shell is in the form of an adjustable nut adapted to enclose the hose and compress the insert against the outer surface of the hose.

* * * * *